June 12, 1945.    F. RIEBER    2,377,903
SYSTEM FOR GEOLOGICAL EXPLORATION BY ELASTIC WAVES
Filed May 1, 1933    6 Sheets-Sheet 1
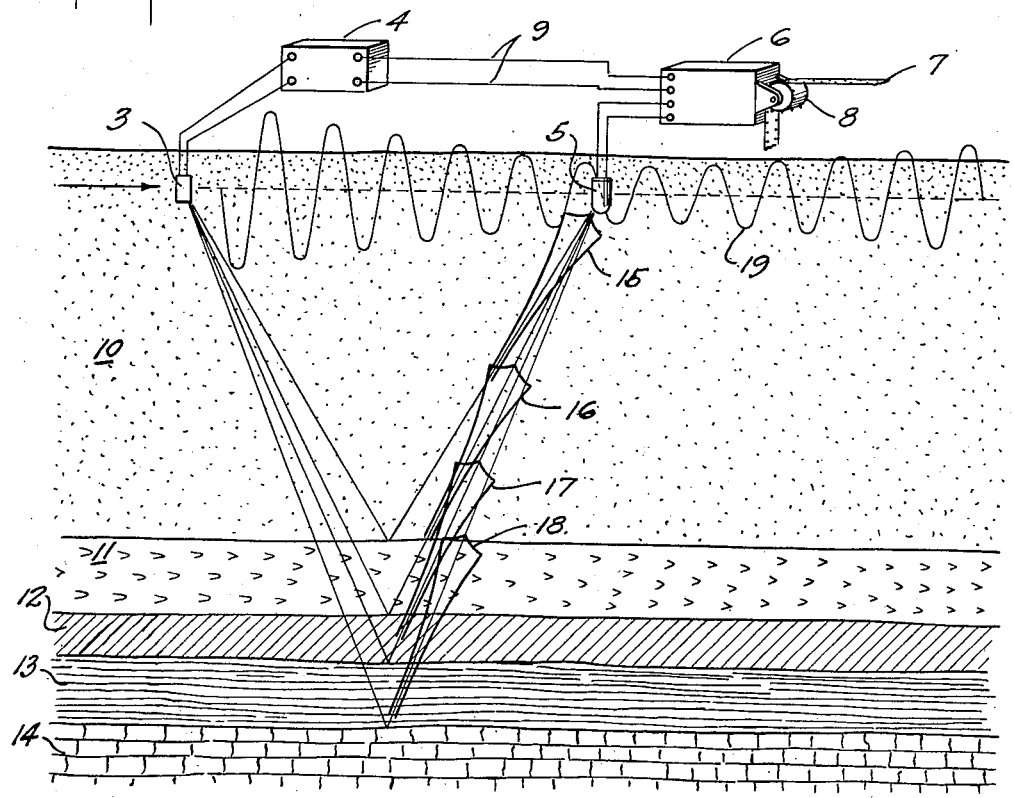
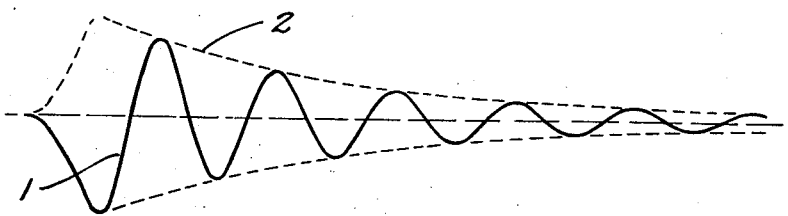
INVENTOR
Frank Rieber
BY John Flam
ATTORNEY June 12, 1945.    F. RIEBER    2,377,903
SYSTEM FOR GEOLOGICAL EXPLORATION BY ELASTIC WAVES
Filed May 1, 1933        6 Sheets-Sheet 2
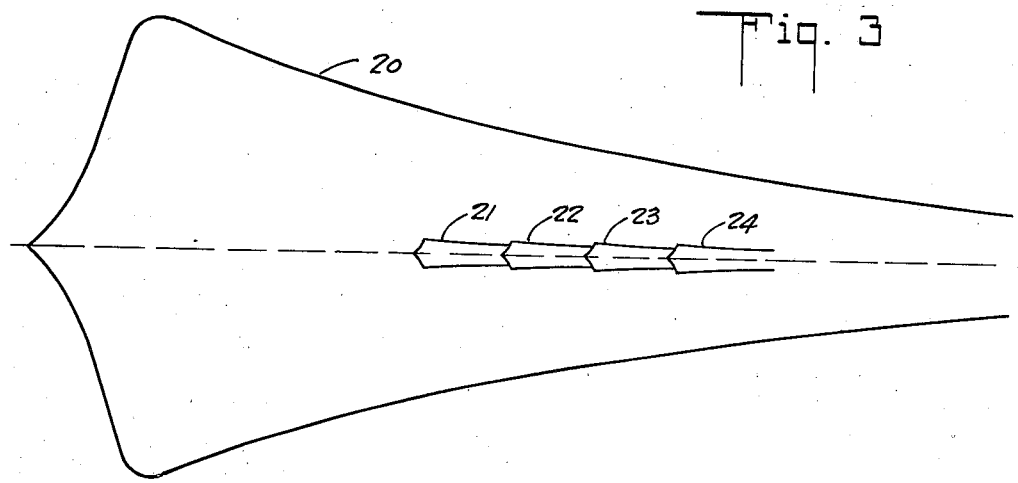
Fig. 3
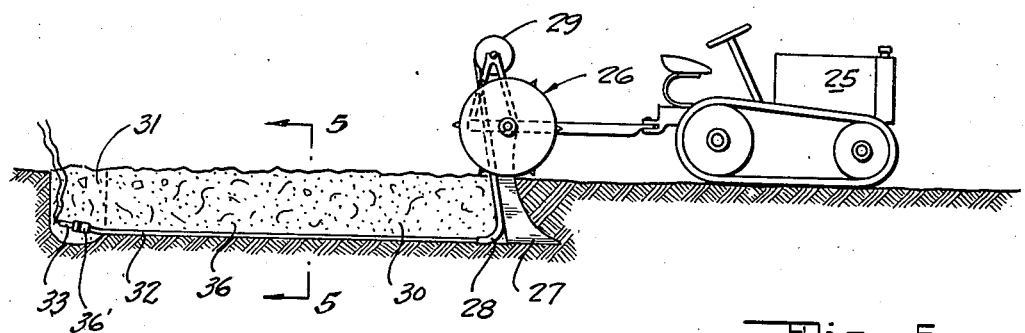
Fig. 4
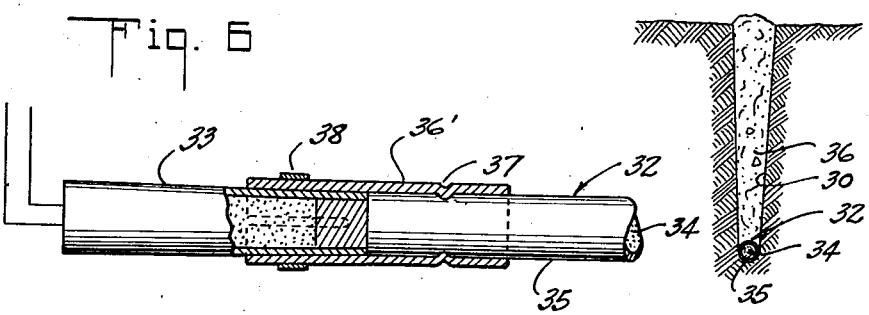
Fig. 6
Fig. 5
INVENTOR
Frank Rieber
BY John Flam
ATTORNEY June 12, 1945. F. RIEBER 2,377,903
SYSTEM FOR GEOLOGICAL EXPLORATION BY ELASTIC WAVES
Filed May 1, 1933 6 Sheets-Sheet 3
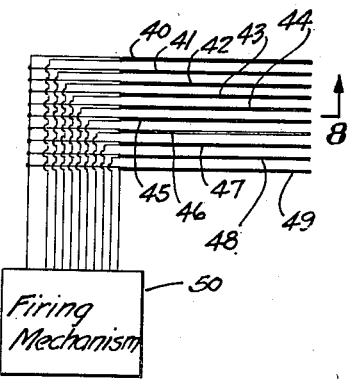
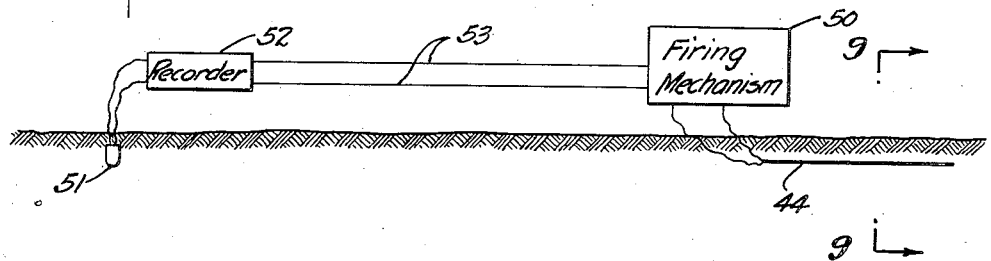
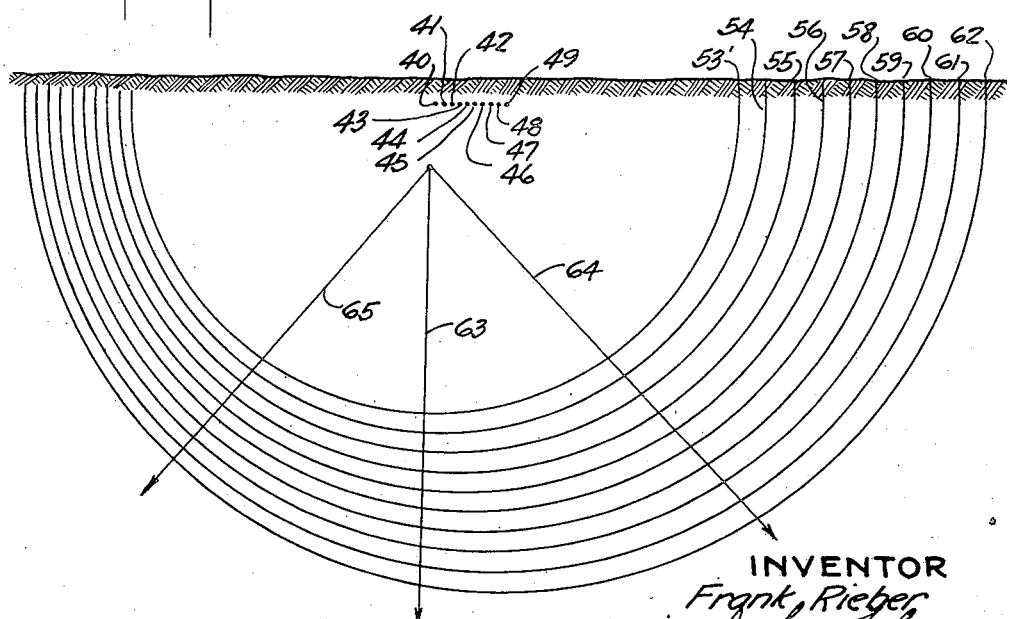
INVENTOR
Frank Rieber
BY John Flam
ATTORNEY June 12, 1945.   F. RIEBER   2,377,903
SYSTEM FOR GEOLOGICAL EXPLORATION BY ELASTIC WAVES
Filed May 1, 1933    6 Sheets-Sheet 4
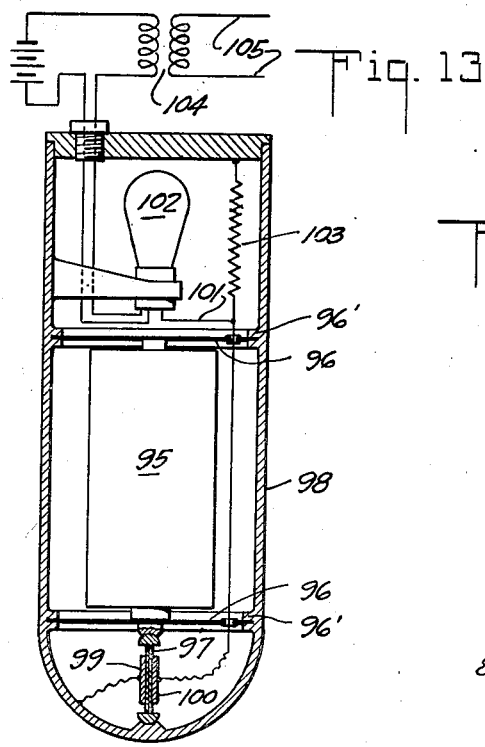
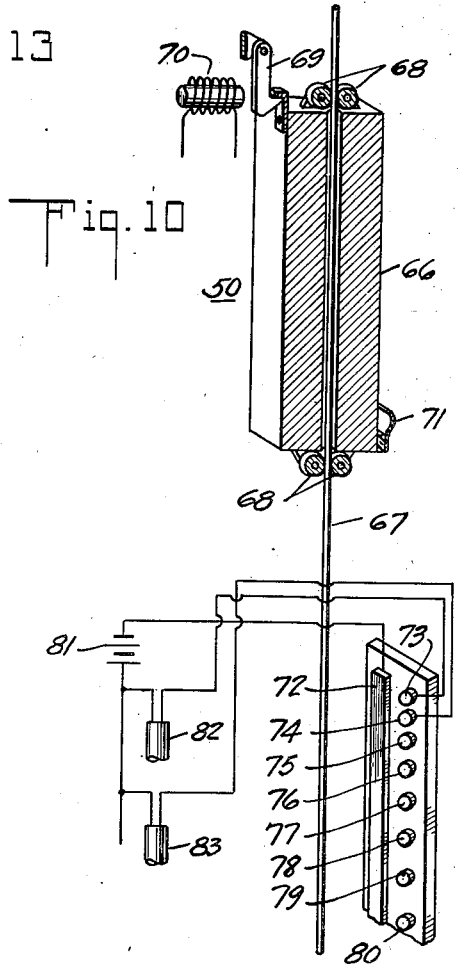
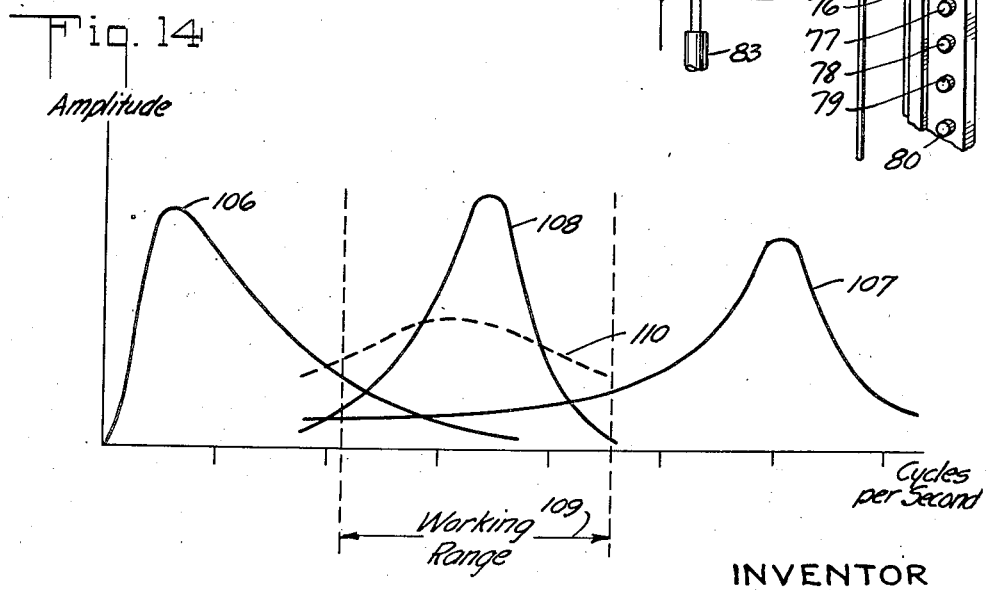
INVENTOR
Frank Rieber
BY John Flam
ATTORNEY June 12, 1945.  F. RIEBER  2,377,903
SYSTEM FOR GEOLOGICAL EXPLORATION BY ELASTIC WAVES
Filed May 1, 1933  6 Sheets-Sheet 5
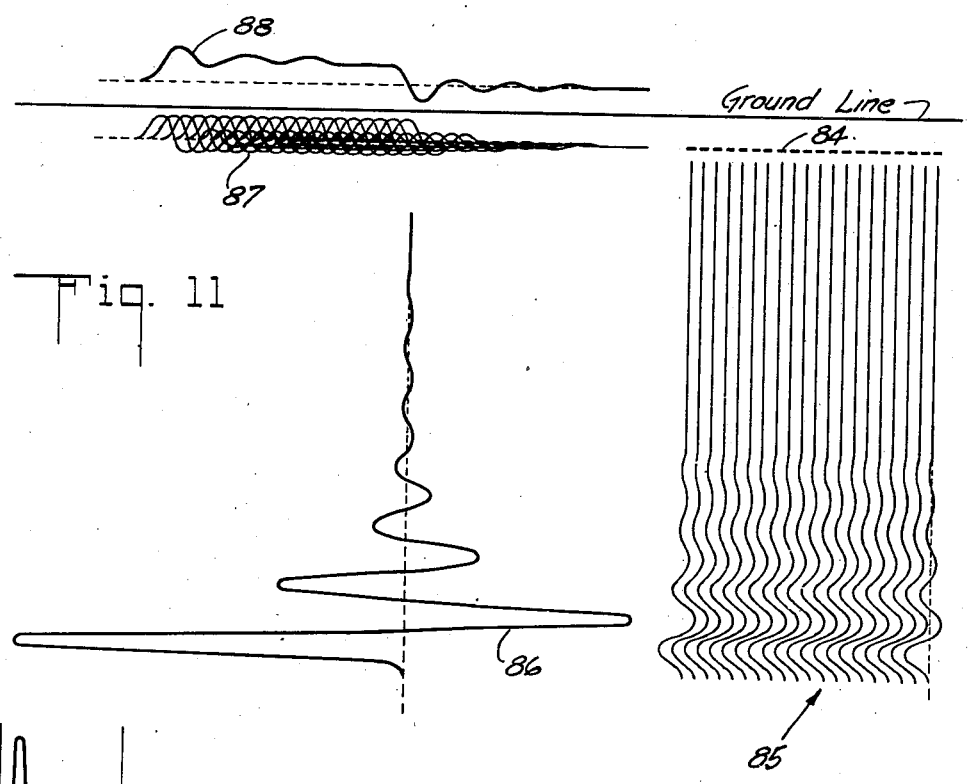
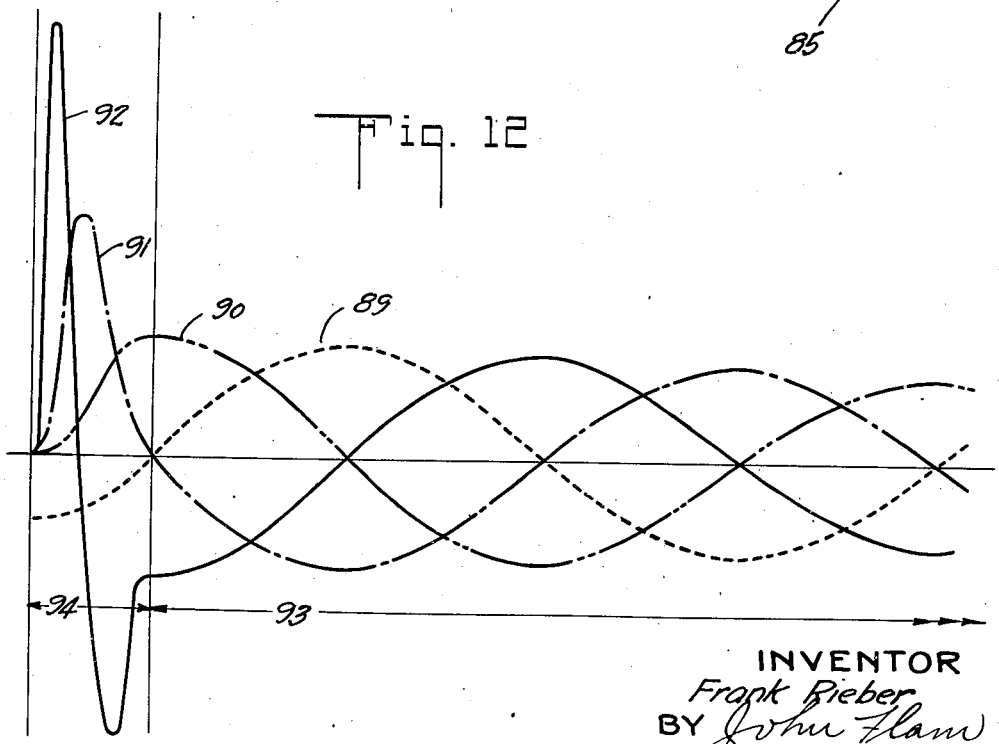
INVENTOR
Frank Rieber
BY John Flam
ATTORNEY June 12, 1945.  F. RIEBER  2,377,903
SYSTEM FOR GEOLOGICAL EXPLORATION BY ELASTIC WAVES
Filed May 1, 1933  6 Sheets-Sheet 6

INVENTOR
Frank Rieber
BY John Flam
ATTORNEY

Patented June 12, 1945

2,377,903

UNITED STATES PATENT OFFICE 2,377,903

SYSTEM FOR GEOLOGICAL EXPLORATION BY ELASTIC WAVES

Frank Rieber, Los Angeles, Calif., assignor, by direct and mesne assignments, to Continental Oil Company, Ponca City, Okla., a corporation of Delaware Application May 1, 1933, Serial No. 668,717

13 Claims. (Cl. 177—352)

My invention relates to a system whereby elastic waves are radiated into the earth from an explosion near the surface, and picked up by a receiver at a distance and recorded as a succession of wave trains whose character and time sequence have been modified by the geological structure through which they have passed.

An object of my invention is to provide a system by which the successive times of arrival of closely spaced or overlapping wave trains may be clearly defined.

A further object of my invention is to provide a system whereby waves arriving at the receiver from any desired direction may be recorded, and waves arriving from other undesired directions may be suppressed.

A further object of my invention is to provide a system whereby closely spaced stratifications in geological formations may be clearly defined and recognized as individual layers.

A further object of my invention is to provide a system which can record reflected elastic waves returned by strata or interfaces of very poor reflecting characteristics.

A further object of my invention is to provide a system whereby the direction and angle of dip of strata may be readily determined.

Further objects of my invention will appear from the following disclosure.

In general, I accomplish the improved results above referred to by the use of one or more of the following novel elements.

First: a different and more efficient means for transferring energy from an explosion into vibratory motion of the earth.

Second: by providing a means for placing the novel form of explosive charge above referred to, into operative corelation with the earth, easily, inexpensively, and rapidly.

Third: a novel method for causing a plurality of explosive charges to cooperate in radiating into the earth waves having a predetermined predominant vibratory frequency.

Fourth: a novel arrangement for spacing and firing a plurality of explosive charges whereby vibrations propagated in different directions from the origin of the explosions will have different predominant frequency and amplitude characteristics.

Fifth: a transducer or receptor adapted to be acted upon by elastic mechanical waves, the said transducer being more sensitive to the first increment of vibration in any wave train, and less sensitive to other vibrations later than the said first increment.

Sixth: an electrical system and vibration recording device adapted to receive and record electrical impulses from a transducer, and to accentuate on the said record the vibrations due to the initial waves in any wave train and to suppress subsequent waves in any train.

Elastic waves are used in geological exploration chiefly in two ways.

The first of these is termed refraction shooting, and consists in determining the elapsed time between the instant of explosion and the arrival, at a number of receiving points variously distant from the explosion, of the first wave train. From this series of elapsed times, the paths of the wave trains through the various strata may be plotted and the refraction or change in direction suffered by each wave path may be computed. Ultimately, these computed wave paths may be used to deduce the depth and general character of the successive strata through which the wave trains have passed.

Refraction processes as used at present rely chiefly on the elapsed time between the explosion and the first wave train to arrive at the receiver. Subsequent wave trains from the same explosion arrive later at the receiver, and are duly recorded. Great difficulty is experienced, however, in determining the arrival time of any wave train with the exception of the first, on account of the extremely complex nature of the record of superposed vibrations. Not only is the arrival time of subsequent waves highly doubtful, but usually the very existence of such wave trains cannot be determined from the record by any simple means.

A further difficulty experienced in refraction shooting as at present carried on its that a very large quantity of explosives must be used. The first arriving wave as recorded at a considerable distance will have suffered a large number of refraction changes, at each of which a high proportion of the total energy in the wave train is lost. Hence the arriving wave which must ultimately be recorded is extremely weak in comparison with its magnitude when it started out. This great attenuation cannot be avoided since it depends solely upon geological conditions. The quantity of explosive, however, can be materially reduced if some more efficient means of placing the charge can be devised.

The system of my invention can be used to obtain greatly improved results from refraction work on account of the increased efficiency of radiation of waves from an explosion accomplished by my invention, and further, on account of the various other features which permit separating successively arriving wave trains more definitely on the ultimate record.

The second method of using elastic waves in geological exploration which is now in common use is known as reflection shooting. In this method, waves radiated from an explosion pass downward into the earth and a small portion of these waves is reflected back toward the surface by each interface or boundary plane between strata where the elastic characteristics or the densities of the two strata contacting at the interface differ by an appropriate amount. A receiver placed usually relatively close to the explosion may be used to pick up and record these successively arriving reflected wave trains. If an appropriate time scale is likewise recorded on the record, the total elapsed time between the instant of explosion and the instant of arrival of any reflected wave train may be determined. From this elapsed time and from a knowledge of the velocity with which the waves have travelled on their paths, the depth of the reflecting interface may be deduced.

The chief difficulty experienced in reflection shooting as commonly carried on is that the explosion sets the surface of the earth into violent agitation which persists during the time when reflections may be expected to return to the receiver. This continuing surface agitation is frequently many times greater in amplitude than the expected reflections, and unless the receiver is in some way able to discriminate between the surface agitation and the reflection, an entirely illegible record will result, with no possibility of determining by inspection the time of arrival of any reflection, or even the existence of such reflections. This difficulty may be partially overcome by placing the explosive charge in a deep drill hole, under which conditions a smaller surface agitation and a greater proportionate downward radiation of energy may result. Drilling of such deep holes, however, is very expensive and slow and requires cumbersome equipment which limits the mobility of the system.

A further difficulty encountered in reflection shooting lies in the fact that geological formations frequently contain a succession of strata relatively closely spaced, and all having relatively small reflecting characteristics at their interfaces. Under these conditions, each interface will send a separate reflected wave train to the surface, and these wave trains will arrive at the receiver at short intervals of time. If each wave train consists of a finite number of vibrations, and therefore persists for an appreciable time, the successive wave trains will overlap one another, thereby confusing the record so that little if any information may be derived from it.

It is very commonly recognized by those skilled in the art that a very small explosion will generate waves of shorter period than those from a large explosion. Hence a train of such short period waves will have a shorter total time of duration than will the wave train from a larger explosion. For this reason, the explosions used in reflection shooting are usually made as small as possible in order to generate the shortest possible duration of the train of waves.

However, the receiver in a reflection system is continually exposed to vibrations other than the expected reflection. Wind action, highway traffic, and all forms of earth and air borne sound act on such receiver and produce agitation of the recorder. In order for reflected waves to be recognized and identified, they must obviously produce at the receiver agitation materially greater than that of the other disturbing vibrations, which means that the received waves must have more than a certain minimum energy content.

Therefore, if we are to record reflected waves from any given stratum at a given depth and have the reflected waves discernable above the noise level, we must use not less than a certain charge of explosive. This charge will generate wave trains having a certain minimum period and therefore a certain minimum duration which cannot be decreased by the means commonly in use.

The system of my invention can be used with high efficiency for reflection shooting on account of the fact that the novel explosive arrangement which I employ, together with the receiving system, can be used to produce on the record, wave trains of extremely short duration, thereby defining closely spaced beds without overlapping and confusion of the successive wave trains. My system further provides novel means for eliminating to a great extent the effect upon the receiver of the persistent surface agitation from the detonation of the explosion.

For the further comprehension of my invention, reference may be had to the accompanying drawings in which:

Fig. 1 is a diagram of a damped wave train illustrating the employment of the wave train envelope for convenience in diagramming;

Fig. 2 is a generalized diagram of a reflection system;

Fig. 3 is a diagram of the wave envelopes on a record obtained by the system of Fig. 2;

Fig. 4 illustrates one form of the novel method of placing explosive charges comprised in my system;

Fig. 5 is a cross sectional view of the explosive placing shown in Fig. 4;

Fig. 6 is a detail view showing the manner of connecting the electric detonator to the explosive charge;

Fig. 7 is a diagram showing the relative placing of a group of explosive charges and of the receiver, as used in the system of my invention;

Fig. 8 is a cross section of the arrangement shown in Fig. 7;

Fig. 9 is a cross section of the arrangement shown in Fig. 7, in a direction transverse to that of Fig. 8;

Fig. 10 illustrates one form of firing mechanism which may be employed in my system for detonating successively a group of explosive charges;

Fig. 11 is a diagram illustrating the type of vibratory energy radiated in various directions by the novel form of explosive charge employed in the system of my invention;

Fig. 12 is a diagram illustrating the vibratory motion of a particle of earth at a distance from an explosion, together with the first, second, and third derivations of this displacement with respect to time;

Fig. 13 is a diagram illustrating the elements employed in a receptor which may be used in the system of my invention;

Fig. 14 is a diagram showing the amplitude frequency characteristics of a typical explosion, a typical receptor, and a typical recording device as employed in my system.

Figure 15:
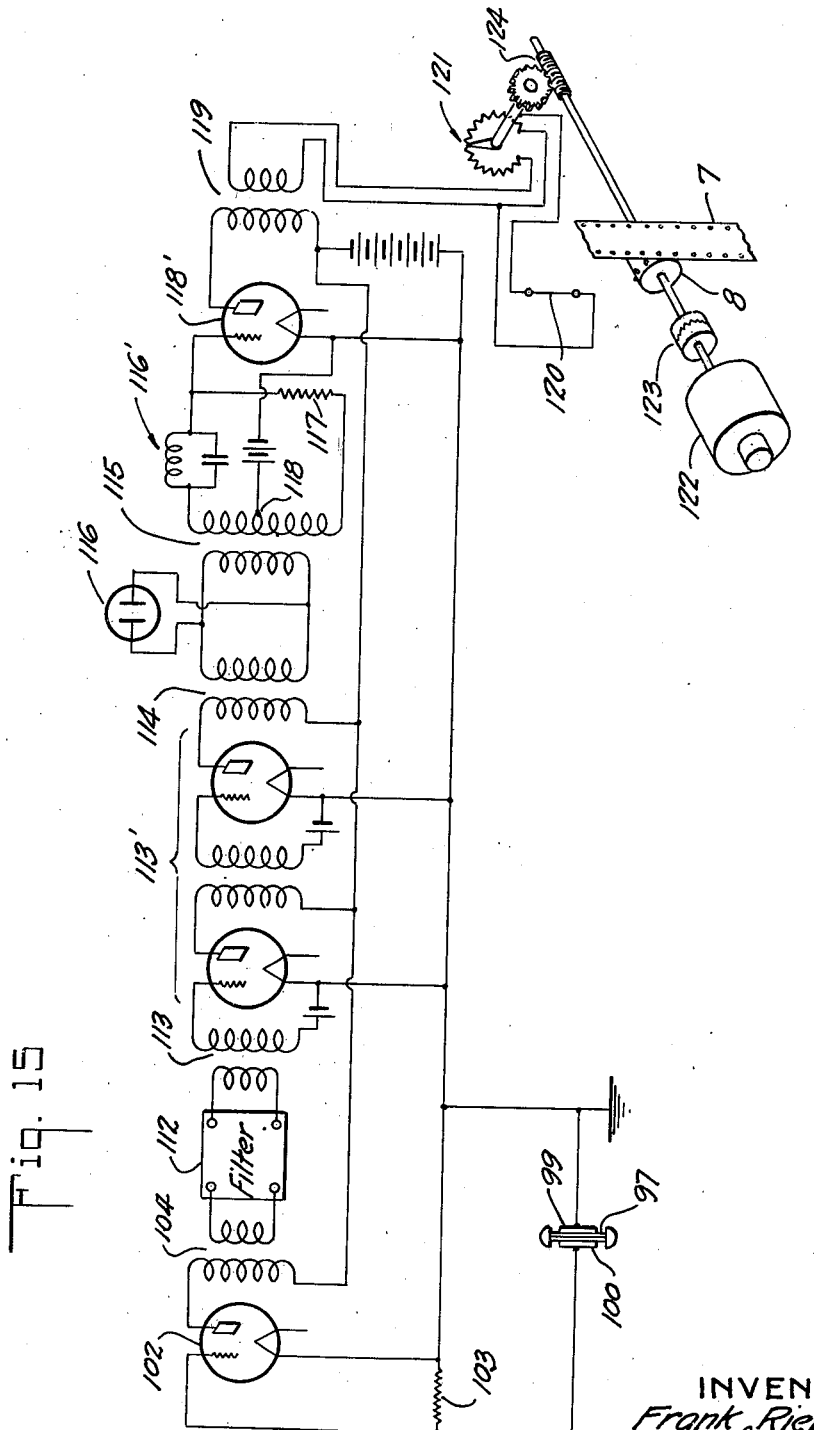
Fig. 15 is a conventional wiring diagram of the receiver and recorder used in my system.

Referring to Fig. 1, a damped wave train 1, is shown such as might be recorded by a refraction or reflection seismograph. An envelope 2, surrounding the damped wave train, may be drawn tangent to the crests, and such an envelope may be used in diagrams indicating wave trains with greater convenience than the actual record of vibrations, and has accordingly been employed in the following illustrations.

In Fig. 2, illustrating a system for reflection shooting, an explosive charge 3 is preferably buried near the earth's surface. A firing battery 4 is used for detonating the charge 3. A receiver 5 is buried in the earth and is adapted to receive vibrations set up by the detonation of the charge 3, and to convert the same into electrical impulses. A recording device 6 is adapted to be acted upon by electrical impulses from the receiver 5 and when so acted upon to produce a record of these impulses upon the record strip 7, which is driven mechanically past the recorder by the rotating sprocket drum 8. Connections 9 between the firing device 4 and the recorder 6 serve to transmit and cause to be recorded an electrical impulse designating the instant of detonation.

Successive layers or strata, such as 10, 11, 12, 13 and 14 are in the geologic formation lying below the explosion and receiver. The envelope 15 represents the wave train reflected from the interface 10—11, while envelopes 16, 17 and 18 represent successive and later reflections from the interfaces 11—12, 12—13 and 13—14 respectively. The direct wave train 19 is set up by the persistent vibration of the earth in the region of the explosion 3.

Fig. 3 represents in diagrammatic form the type of record which would be furnished by the arrangement shown in Fig. 2. The envelope 20 represents the recorded direct wave while envelopes 21, 22, 23, and 24 represent the successively arriving reflected waves. The purpose of Fig. 3 is to illustrate the difficulty commonly experienced in reflection shooting, when the surface wave arriving at the receiver and persisting during the arrival of the reflections, is of such great magnitude as to obscure the latter entirely. The relative magnitudes of the envelope and the reflections as illustrated in Fig. 3 are as a matter of fact more favorable to the production of a legible record than those often encountered in the field. It will also be observed that even if the direct wave 20 could be eliminated from the record or greatly suppressed in magnitude, the reflected waves 21—22—23—24 would still be confused on account of their overlapping. Such confusion can obviously best be eliminated by shortening the record of each wave train, or by greatly accentuating the initial portion of each wave train, which is one of the results accomplished by the system of my invention.

Fig. 4 illustrates one of the methods which may be employed for laying or planting explosive material in accordance with my invention. I have termed this type of explosion a linear shot, and shall refer to it hereafter under this title.

Referring to Fig. 4, a tractor or source of power 25, pulls a plow 26. This plow is provided with a narrow blade 27 adapted to penetrate well into the earth, but to displace the earth laterally to only a small degree. A tube 28 is attached to the back of the blade 27, the lower extremity of the said tube being curved backwards so as to trail behind the said blade in the trench formed by the plowing action. Upon a spool 29 is wound a supply of tubing containing explosive material, to be later described in greater detail. This tubing is fed downwards through the tube 28, which serves as a guide, and is thereby laid in the bottom of the trench 30 formed by the plow action. Previous to starting the plow 25, a hole 31 may be dug and used as a starting point and as a convenient point to terminate the explosive tubing 32, so that an appropriate electric detonator 33 may be attached to the end of the said explosive tubing.

Fig. 5 represents a cross section of the trench shown in Fig. 4. The tubing 32 has an explosive core 34 in the lead sheath 35. The loose earth 36, remains in the trench after the plow action is completed, due to the fracturing and collapsing of the side walls of the trench. This loose earth, in practice should be tamped down before the explosive charge is detonated. This can be conveniently accomplished by running the tread of the tractor 25 back across the top of the trench.

Fig. 6 is an enlarged detail view showing the explosive tubing employed in my invention, and illustrating the manner of attachment of the detonator or electric blasting cap. A ferrule 36' is slipped over the end of the sheath 35, and crimped in place as shown at 37. The outer end of the ferrule 36' is split, and a detonator or blasting cap 33 may be introduced into this split end, and clamped in place by the sliding collar 38. Lead tubing with an explosive filling of trinitrotoluol, such as I have shown, is commonly used for priming or detonating blasting explosives, and sold under the name of Cordeau fuse, and may be conveniently employed as an efficient embodiment of the sheath 35 with its explosive core 34.

A plurality of linear shots 40 to 49, may be placed parallel to one another, as illustrated in Figs. 7, 8 and 9. For some purposes I may lay these shots at equal distances one from the next, as shown, although this spacing may be varied if required for any reason. A firing mechanism 50 is adapted to detonate the charges 40 to 49 in succession and at predetermined successive intervals of time. A receiver 51 is adapted to receive mechanical vibrations from the earth and to transmit the same as electrical impulses, to a recorder 52. Electrical connections 53 are provided between the firing mechanism 50 and the recorder 52 for the purpose previously referred to, namely, recording on the record the instant at which the series of detonations is started, or completed, as may be preferred.

Referring to Fig. 9, the spaced linear shots are shown at 40 to 49 as they exist before detonation. At an instant after detonation, the respective position 53' to 62 of the first impulses (or advancing wave fronts) radiated from each of the succession of the linear shots 40—49, are shown in proper relation. The line 63 drawn vertically through the circles 53—62, will be observed to intersect the said circles, at intervals which, together with the velocity of propagation of impulses along the line 63, may be used to compute the frequency of effective vibration radiated in the direct line 63 by the group of linear shots 40—49, and produced by the sequence firing. A similar series of approximately regular intervals will be noted along the inclined lines 64 and 65. The train of impulses propagated along the line 65 will, however, have a higher sequence frequency than that of the impulses propagated along the line 63, while these latter will have a higher sequence frequency than the series propagated along the line 64.

In other words, the impulses radiated downward into the earth in the plane of the diagram, Fig. 9, will exhibit an effective frequency, with respect to the sequence of first impulses, dependent on the angle of departure of the wave train element from the group of linear shots 40—49.

I may utilize this property of successively detonated spaced slots, in the method of my invention, in several ways.

First, I may tune a receiving system, or otherwise limit the range of frequencies to which it will respond effectively, the frequency range being selected to correspond to the frequency of radiation from the shot group at some desired predetermined angle of departure. Under these conditions, only that element of radiation leaving the shot at the desired angle will affect the record, the other elements of radiation having different frequencies, and thereby being excluded. Thus I may effectively direct the recordable radiation at any desired angle, where required for special forms of exploration.

Further, I may provide a recorder capable of making, simultaneously a plurality of records, each recording element being tuned to some desired frequency, and thus, from the same group of detonations, I may obtain a series of records of arriving waves from various directions. Such use is convenient, among other uses, in determining dip, or angle of inclination of reflecting surfaces.

Other uses for this property of grouped shots, used according to my method, will appear to those skilled in the art.

Fig. 10 represents details of the firing mechanism 50 shown in Fig. 7. A weight 66 is adapted to slide vertically on a guide 67, friction being minimized by rollers 68. A latch 69 normally restrains the weight 66 from falling. This latch may be released by the action of the electromagnet 70, which is energized by any appropriate means when it is desired to set the mechanism into action. An insulated brush contact 71 is attached to the weight 66 and adapted to engage simultaneously the contact strip 72 and one of the successive contact studs 73—74—75—76—77—78—79 and 80. A battery 81 is so connected as to detonate the electric detonator 82 when the brush contact 71 closes the circuit between the contact strip 72 and the contact stud 73. Similarly, an electric detonator 83 may be detonated when the brush 71 reaches the contact stud 74, and any desired number of similar detonators may be fired thereafter at regular intervals by connecting the same in the electric circuit terminating at the proper contact stud. It will be observed that the contact studs 73 to 80 inclusive are shown as spaced at increasing intervals of distance, in order that the continually increasing velocity of the falling weight 66, cooperating with these increasing intervals, may close the successive electric circuits at equal time intervals.

Fig. 11 illustrates the radiation into the earth in various directions in the plane of a single linear shot; corresponding to only one of the series represented in Fig. 9. Such a shot is illustrated by the line 84, which, for the purpose of illustration, has been divided into short adjacent increments, forming an equivalent to a continuous linear arrangement. A group of damped wave trains 85 progress downward into the earth from the linear shot 84. At any point at a distance from the line of origin 84, and large as compared to the length of this line, and in its perpendicular bisector, the wave trains caused by the increment elements of the line of origin 84, are represented by the individual waves of group 85, the amplitudes of vibration being plotted as a function of time, with time increasing upwards as drawn. The total downward radiation from the linear shot 84 may be shown in diagrammatic form by the summation of all of the individual increment waves shown in the group 85. Such a summation is shown at 86, which represents the form and approximate relative magnitude of the wave train radiated downwards from the linear shot 84. In the summation 86, as in group 85, amplitude is plotted as a function of time, with time increasing upwards as drawn. It is to be observed that the wave trains shown are diagrammatic only. The actual wave motion occurring in the earth is of course in a direction parallel to the line of the propagation, and not transverse as is shown in the illustration.

A group of increment wave trains 87 is propagated horizontally from the linear shot 84, each wave train being assumed to have originated from the detonation of one of the increment shot elements. It will be observed that the successive waves in the group 87 are displaced in the direction of propagation, this being due to the fact that longer and longer time is required for successive increment waves to arrive from the more distant increments in the linear shot 84. The wave 88 represents the summation transmitted from the linear shot 84 in a substantially colinear direction. The wave form 88 is derived by a geometric summation of the increment waves 87. The details of configuration of 88 are due to the choice of increment length in the linear shot. A shorter increment if used for the purposes of computing would result in a smoother envelope for the summation wave 88.

From the diagram Fig. 11, it will thus be seen that a linear shot radiates downwards into the earth an effective wave of large amplitude which accordingly will have an abrupt onset, or steep wave front, while the same linear shot radiates in a colinear direction, an entirely different type of impulse, presenting a far less abrupt wave front. If such a linear shot is detonated near the surface of the earth, and a receiver likewise at the surface of the earth is acted upon simultaneously by the horizontally propogated wave 88 and a reflected portion of the wave 86, and further if the receiver is made to discriminate in favor of an abrupt wave front, and against a more gradual wave front, an effective method is thereby provided for accentuating the reflected impulses and suppressing the disturbing effect of persistent surface waves.

In my system, I make use of this property of linear shots, when desirable, by placing the shot in a horizontal direction, and placing a receiver, having the proper characteristics, in a direction colinear to the shot.

Linear shots may, of course, be approximated to any desired degree by placing a series of small individual shots at spaced intervals, and firing the same simultaneously, and arranging the receiver in a direction colinear to the line of shots. Any series of shots, arranged in a line and fired simultaneously is therefore to be considered as a linear shot, falling within the scope of my invention, while such a series of shots, fired at successive time intervals, is also to be considered as a group shot, or ripple shot, as I have termed that aspect of my invention illustrated in Figures 8, 9, and 10.

An advantage of linear shots, whether in the form of a continuous charge, as illustrated in Fig. 4, or in the approximate form of a line of divided charges, is that such a shot transmits in a direction normal to its extended length, waves of a relatively higher frequency than those obtainable by concentrating the same amount of explosive in one place, and hence gives shorter recorded wave trains, more readily distinguishable if received at short time intervals. A further advantage of a linear shot is a reduction of the lost energy which, in the case of a single concentrated shot, goes into crushing the earth, and a consequent great increase in radiation efficiency.

Of course, the same discrimination can be obtained by using a concentrated charge, and a series of linearly spaced receptors, which add their individual effects on the record.

Fig. 12 illustrates the possible motion caused at the receiver by the arrival of a damped wave train from an explosion. Wave 89 illustrates the displacement of a particle of earth occasioned by the arrival of a wave train. Curve 90 shows the first derivative of this displacement with respect to time, or in other words, the velocity of the earth particle in question. Curve 91 shows the second derivative, or acceleration to which the particle is subjected, while curve 92 shows the third derivative of motion with respect to time. After motion has once been initiated, the subsequent oscillation of the particle takes the form of a damped wave train, a portion of which is illustrated in the region 93. During the initiation of motion, however, the wave form differs from that of a damped sine wave. This region of initiated motion is illustrated at 94, and I shall hereafter refer to that portion of a wave train as the impact transient.

It is obvious that the successive derivatives of wave motion with respect to time will show steeper and steeper wave fronts as the derivation process progresses, during the impact transient region. This fact is utilized, by the system of my invention, to provide a receiving system which will discriminate in favor of the impact transient in any arriving wave, and discriminate against the succeeding damped wave train.

Fig. 13 illustrates a receiving device for providing the discriminating action just mentioned. A mass 95 has a certain degree of freedom to move in the vertical direction, subject to the guidance of the diaphragms 96. These diaphragms are held at their edges in flanges 96' on the interior of casing 98. A piezoelectric crystal 97 abuts on the mass 95 and on the lower end of the container 98, which in use is placed in contact with the earth. Motion of the earth in a direction parallel to the axis of the mass 95 and the crystal 97 will cause force to be transmitted from the casing 98 through the crystal 97 into the mass 95. In transmitting such force, the crystal 97 will be deformed and this deformation together with the piezoelectric properties of the crystal, causes a difference of electric potential between the coatings 99 and 100 attached to the crystal 97. This difference of potential results in an electric impulse being transmitted to the grid terminal 101 of the vacuum tube 102, whose normal potential is maintained at an appropriate value through the resistor 103. The plate current from the tube 102 is transmitted through a transformer 104 with output terminals 105.

The mass 95 and the elastic characteristics of the crystal 97 cooperate to give the receiving device as shown a natural period or frequency of vibration. If the device is acted upon by earth vibrations of a higher frequency than its own natural frequency, the coatings of the crystal 97 will acquire potential variations which will depend principally upon the amplitude of earth motion. If, however, the device is acted upon by earth vibrations of a lower frequency than its own fundamental vibratory frequency, the potentials developed across the coatings of the crystal 97 will depend principally upon the acceleration component of the vibratory motion of the earth. The reason for this is that the potential difference is directly proportional to the deformation of the crystal, which again is proportional to the force transmitted from the earth to the mass through the crystal. This force serves to accelerate the mass. Hence the electrical potential difference developed across the crystal is a direct function of the acceleration. The potential changes delivered from the plate circuit of the tube 102 to the transformer 104 will, therefore, under the latter named conditions, likewise correspond to the acceleration component of the earth motion, while the output of the transformer 104 to the terminals 105 will correspond to the time derivative of acceleration, or to the third derivative of earth motion as illustrated in the wave form 92 in Fig. 12.

Such a third derivative receptor is accordingly adapted to discriminate in favor of the impact transient portions of arriving wave trains and against the subsequent damped wave portions of such trains and is used in the system of my invention to accentuate the record of the instant of arrival of such trains, and to prevent on the record the interference experienced in previous methods when two successive wave trains arrive at the receiver at such a short time interval that the records overlap.

Referring back to Fig. 11, it will be seen that the impact transient of the wave 86 should provide a comparatively much more abrupt third derivative than the wave form 88, while the latter portions at the wave 88 would furnish very little energy of a type adapted to disturb a third derivative receptor.

Referring again to Fig. 12, it will be seen that, if there is a potential output 92 of a third derivative receptor when acted on by a damped wave train, an electric filter may be provided which will discriminate in favor of that portion of the wave 92 included in the impact transient region 94, the same filter discriminating against the wave form of the wave 92 occurring in the damped wave region 93.

This is possible because the predominant frequency components of the wave 92 in the impact transient region are much higher than in the region 93.

Fig. 14 is a diagram showing the amplitude/frequency relation of the various elements involved in the system of my invention. The amplitude/frequency content of the damped wave portion of vibrations from an explosion, shown at 92 in Fig. 12, is represented by curve 106. Curve 107 represents the amplitude/frequency curve or response curve of a properly tuned receptor such as is shown in Fig. 13. Curve 108 represents the corresponding response curve of the recording system which may conveniently be determined by the use of a string galvanometer tuned to respond over the frequency range illustrated. Instead of such tuning, I may, however, employ a band pass filter to limit the response of the recording system to the approximate recording range shown in range 109. Curve 110 shows the possible amplitude frequency distribution occurring in the impact transient region. Graphically, therefore, Fig. 14 illustrates the discriminatory action of a third derivative receptor and a recording system restricted to an appropriate frequency range, which results in accentuating the impact transient region of a wave train from an explosion, and suppressing the damped wave portion.

A tuned receiving system, responding over the range shown in Fig. 14, is likewise utilized, in the system of my invention, to permit selection from the complex wave motion of the earth, those frequency components radiated from a group or ripple shot, in any desired predetermined direction, as has been previously described in connection with Figures 7, 8 and 9. Such a tuned or limited recording element is, therefore, one of the important elements in securing a higher degree of discrimination in favor of reflected waves, and against surface waves in accordance with my system.

Fig. 15 is a conventionalized diagram of a complete receiving system used in the method of my invention in which 97 represents a piezo-electric crystal. A grid supply resistor 103 may or may not be furnished with biasing potential, depending on the characteristics of the vacuum tube 102. The tube 102 acts on the transformer 104 to deliver energy through the filter 112 to the input transformer 113 of a conventional transformer coupled amplifier 113' designed to operate effectively at the range of frequencies experienced in practice. This amplifier may have as many stages as required by the conditions of use, its output transformer 114 supplying energy to the input transformer 115 of a network circuit later to be described. A potential limiting or energy limiting device 116 such as a two-electrode gas filled tube, is adapted to draw no current whatever until its flashover potential has been reached, and thereafter to act as an effective load on the circuit greatly reducing the energy which can be passed on into the transformer 115. The limiting device 116 thereby acts to permit the unrestricted passage of small electrical impulses, but to limit to a certain maximum potential the energy passing the device when it is acted on by large input impulses.

The parallel resonant circuit 116' and the resistance 117, together with the mid-tap 118 of the secondary of transformer 115 form a network which I have termed an impulse network. This impulse network, when acted upon by alternating potential applied to the transformer 115, at the resonant frequency of the circuit 116', is so adjusted, by varying the resistance 117, that the output from the network to the tube 118' is reduced either to zero or to some small predetermined value. This condition implies that the effective impedance of the resonant circuit 116' and the impedance of the resistance 117 will have approximately equal values for constant excitation. Under such circumstances the potential difference across the input electrodes of amplifier 118' reduces to zero.

The impedance of the resonant circuit 116' is due, however, under steady excitation, to the fact that the circuit is in oscillation. If the impulse network is acted upon by a wave train, whose frequency is approximately that for which the circuit 116' is tuned, the said resonant circuit will require a sensible time during which it is to be set into a condition of oscillation, before its impedance value will approximately balance that of the resistance 117. During this time when oscillation is being established, the impulse network will not be balanced, and an appreciable amount of energy will be transferred to the tube 118' and from it to the output transformer 119 which supplies current to the vibratory string 120 of a recording galvanometer. This current is supplied through a gain control 121 (in series with string 120), which may include a variable resistance. The motion of this gain control controls the effective overall amplification with which mechanical impulses acting on the crystal 97 will be recorded on the photographic record 7 which is driven by the sprocket drum 8 and the driving motor 122 acting through the clutch 123.

A worm and gear 124 mounted on the same shaft as the sprocket drum 8, are adapted to drive the gain control 121, the worm gear ratio being so determined that the overall amplification will vary as some predetermined function of elapsed time. In use, the motor 122 is started, and the clutch 123 is engaged at or slightly before the instant at which a distant explosion is to be detonated. This starts the motion of the film 7 and likewise starts the alteration of amplification due to the gain control 121. Successive wave trains, reflected or refracted from the vibrations radiated by the explosion, will thereafter reach the crystal 97, and by acting upon it in cooperation with the mass 95 shown at Fig. 13, will cause electrical impulses to be transmitted to the vacuum tube 102. These electrical impulses may have a wave form such as that illustrated at 92 in Fig. 12, and, upon being passed through the filter 112, the impact region shown at 94, Fig. 12, will be accentuated, and the balance of the wave form shown in 93, Fig. 12, will be suppressed. These impulses, after passing the filter 112, will be amplified before reaching the transformer 114. Such of these impulses as may exceed the maximum limit for proper recording will be prevented from passing to the transformer 115 by the action of the energy limit 116.

The first group of impulses due to any wave train, on reaching the transformer 115 will be able to pass through the impulse network 116'—117, and will be further amplified by the tube 118' and delivered through the transformer 119 and the gain control 121 to the recorder string 120, by which, in cooperation with the well known optical projection system used in string galvanometers, these impulses will be ultimately recorded on the moving film 7. Reflections arriving successively from more and more distant strata will each act in this same manner on the apparatus. If the strata all have approximately the same reflecting characteristics, the successively arriving reflected wave trains will have a continually decreasing amplitude, due to the fact that each successive train has travelled a greater distance to and from its reflecting stratum, and by this greater distance has been attenuated to a greater amount. The action of the gain control 121, however, prevents this decrease in the size of reflected waves from changing the recorded amplitude appreciably. As a result, and due to the action of this time gain control, reflections of the same order from a widely spaced series of strata may be recorded on one and the same record without either exceeding recordable magnitude in the case of the nearer strata, or falling below readable magnitude in the case of the more distant strata.

Without some such device as the time-gain control illustrated, several shots might be needed to define a series of strata, each shot being recorded in a readable manner only over a short length of record.

This change of amplification with time may also be accomplished with electrical circuits of the delay type. For example, I have used the rate of potential change in a circuit containing a condenser and a resistance, and arranged to supply grid potential to one of the initial tubes in the amplifier circuit, and hence to vary its effective amplifying characteristic.

I prefer, however, to accomplish the change of amplification utilized in my invention by the positive mechanically driven means shown. The gain control, while illustrated as directly preceding the recorder, may obviously be placed in any portion of the circuit desired.

As an illustration of the physical dimensions involved in the system I have described, previous attempts have utilized receiving systems whose maximum sensitivity falls around sixty cycles, this being the approximate vibratory frequency of the wave trains excited in the earth by concentrated charges of dynamite of a magnitude sufficient to return recordable reflections from strata at a depth of several thousand feet. This frequency varies somewhat but is seldom higher than seventy-five cycles. An average velocity for the propagation of wave fronts below the surface of the earth may be taken as approximately seven thousand feet per second, which at seventy cycles frequency would give a distance between successive wave fronts of approximately one hundred feet. Difficulty will be experienced under these conditions in defining successive strata unless they are separated by several wave lengths; that is, to say, several hundred feet. Other difficulties incident to the employment of these low frequencies arise from the similarity of reflected wave trains to persistent surface disturbances of the same order of frequency, as I have previously mentioned.

In the system which I prefer, the explosive tubing may have an internal diameter between one-quarter and one-half inch, and a single linear charge of such explosive may have a length of from ten feet to one hundred feet. These dimensions are approximate only, and are variable to suit conditions. Using such linear shots, strong downward components of vibration may be obtained over a frequency range well above one hundred cycles. Any part of this frequency range may be selected for use depending on surface and subsurface conditions. Less energy is of course available at the very high frequencies, and such vibrations as are present in this higher range are also more rapidly attenuated in passing through earth. In spite of these disadvantages, high frequency vibration components may be utilized on account of the better definition obtainable for a closely spaced sequence of reflecting surfaces. I have identified and recorded vibrations generated during the impact transient phase of the detonation of linear shots and of frequency exceeding one thousand cycles per second. This is given simply as an illustration, however, of the frequency range available. The choice of the desired range is a matter depending entirely on working conditions.

The spacing between parallel linear shots as used in my method of ripple firing also offers a wide latitude of choice, depending on working conditions. In fact, this extreme flexibility constitutes one of the great advantages of my system. If it is desired for example to radiate energy downwards, and to have no great change in effective frequency with the angle of direction, I may place such shots as close together as plowing conditions will permit. A minimum separation of one foot between charges may thus be utilized. If I desire to produce radiation whose frequency depends to a great extent on the direction of propagation, I may increase this distance to ten or twenty feet between successive linear shots.

As to the frequency with which successive shots may be detonated, a wide latitude of choice is again possible. A satisfactory frequency for defining minor changes in stratification in recent sedimentary rocks has been found to lie between two hundred and four hundred cycles per second, although the operation of the system is not limited to this frequency range.

The important essentials provided by my system are the creation of a distinctive type of wave train of limited time duration, and directional characteristics, together with a receiving and a recording system adapted to differentiate this distinctive wave train to a very high degree from all other disturbing and confusing vibrations.

The terms "waves," "vibrations," or "wave trains" refer to motion established in the earth as the result of an explosion.

These motions may be made to affect the electrical apparatus which I have disclosed, and may thereafter be recorded, although in somewhat modified form, as vibrations or wave trains. This recording can be done by omitting some of the elements of the complete system described in this specification.

I prefer, however, to utilize the complete system herein described which operates to analyze out of the complex earth motion only such portions as correspond to the impact transient regions of any wave trains arriving at the receiver. This is done, in the manner hereafter described, by limiting energy passed on to the recorder as completely as possible to that derived from the impact transient region only.

The motion occurring in this impact transient region may also be described as impulse. As it arrives in the earth, it is unidirectional, and occurs only once at the beginning of any wave train. Impulse, being a non-recurring motion, is thereby differentiated by definition from waves, which repeat themselves and consequently have periodicity or frequency characteristics.

I claim:

1. The method of exploration which comprises laying a mass of explosives in operative relation to the earth so as to form a substantially horizontally extended linear element, detonating said mass, and receiving the resultant elastic waves at a receiver in operative relation to the earth.

2. The method of exploration which comprises laying a series of linearly arranged masses of explosives in operative relation to the earth, in a substantially horizontal, parallel relation, detonating the series in timed sequence, receiving the resultant elastic waves at a station substantially colinear with said series, and tuning the receiver to respond most strongly to that frequency of the waves which corresponds to the timed sequence.

3. The method of geophysical exploration which comprises detonating an explosive charge near the earth's surface, receiving near the earth's surface, the resultant sequence of wave trains into which the original wave trains of the explosion have been separated by geological conditions, and passing on from the receiver to a recorder the full magnitude of only the first few vibrations of each wave train.

4. In a system of the character described, a translating device, a network having a resonant circuit branch and a parallel branch having resistance, the impedances of which are equal at a definite frequency, and means for connecting opposite terminals of said device into the network at points the potentials of which become equal when the device is excited by continuous electrical waves at the frequency of the resonant circuit.

5. In a system of the character described, an electric circuit adapted to receive and pass trains of electrical impulses, each train being preceded by an impact transient interval, said circuit including a device requiring a time interval during reception of such trains to attain a maximum impedance, as well as a device having a constant impedance, a member, and means connecting said member to said devices in such manner as to be sensitive to the wave train energy corresponding to the difference in the impedances, whereby the impact transient portions of the trains can strongly affect said member while the constant excitation produced by the wave train is relatively ineffective to affect said member.

6. In combination, means adapted to receive and transmit electrical impulses, having a center tap and end terminals, a circuit connected at one end to one of the terminals, another circuit connected at one end to the other of said terminals, the opposite ends of both circuits being connected together, one of said circuits including a parallel resonant impedance device, resonant to a definite frequency, the other of the circuits having a non-resonant impedance substantially the same as the impedance of the circuit that includes the parallel resonant impedance, at the frequency of resonance of said parallel resonant impedance, and a translating device connected between the center tap and the junction of the ends of both circuits.

7. A system for transmitting electrical impulses having no pronounced frequency characteristic and for materially hindering the transmission of electrical impulses having a definite frequency characteristic, comprising a pair of parallel circuits, a translating device connected across the ends of the circuits, one of said circuits including a resonant impedance that is tuned to the said impulse frequency, the other circuit having a non-resonant impedance substantially equal to the resonant impedance at the said definite frequency, and means for impressing on both circuits, equal and opposite electromotive forces corresponding to the received impulses.

8. A system for transmitting electrical impulses having no pronounced frequency characteristic, and for materially hindering the transmission of electrical impulses having a definite frequency characteristic, comprising a translating device having a center tap and creating an electromotive force between its terminals corresponding to the impulses, a parallel resonant circuit in series with one of the terminals and resonant at the definite frequency, a non-resonant impedance in series with the other terminal and having an impedance substantially equal to the impedance of the parallel resonant circuit at the definite frequency, the other end of said non-resonant impedance and the other end of said parallel resonant circuit being joined, and an amplifier having its input circuit connected between the center tap and the joined ends of the non-resonant impedance and the parallel resonant circuit.

9. In a system of the character described, an electric circuit adapted to receive and pass trains of electrical impulses, each train being preceded by an impact transient interval, said circuit including a device requiring a time interval during reception of such trains to attain a maximum impedance, as well as a device having a constant impedance, said circuit also having a translating device in which an electromotive force is produced corresponding to the impulses, said impedance devices being in series with said translating device, and a member connected between an intermediate point of the translating device and a point between said impedance devices.

10. In a system of the character described, an electric circuit adapted to receive and pass trains of electrical impulses, each train being preceded by an impact transient interval, said circuit including a device requiring a time interval during reception of such trains to attain a maximum impedance, as well as a device having a constant impedance, said circuit also having a translating device in which an electromotive force is produced corresponding to the impulses, said impedance devices being in series with said translating device, and an amplifier having its input side connected between an intermediate point of the translating device and a point between said impedance devices.

11. An apparatus for recording, on a limited width of recorder strip, artificially produced seismic waves which include waves traveling from the source to the seismic detector through the surface layers of the earth and waves received from underlying strata of the earth, the surface waves being the first to arrive and comprising an initial weak vibration followed by very strong vibrations of progressively diminishing magnitude, and the waves received from underlying strata comprising a series of wave trains, said wave trains and the individual waves in each wave train diminishing in relative energy substantially as a function of time, comprising a seismic detector for converting the seismic waves into oscillating electrical energy, amplifying means for amplifying said electrical energy, means adapted to record said amplified electrical energy on said recorder strip, and means for controlling the sensitivity of the apparatus in such a way that the initial waves of any wave train from an underlying stratum are recorded at a sensitivity greater than that at which the initial waves of the preceding stronger wave train are recorded.

12. An apparatus for recording decaying transients comprising a detector, an amplifier adapted to amplify the impulses from said detector, a recorder connected to said amplifier for recording the impulses from the amplifier, means for varying the recorder response substantially inversely to the amplitude of the decaying transient to be recorded in a way to effect recording of the waves of smaller magnitude with sufficient magnitude to permit their form to be studied.

13. A system for recording a series of seismic waves whose magnitude diminishes substantially as a function of time comprising in combination, a source of seismic waves, an electrical seismic wave detector, a recording galvanometer connected to said seismic wave detector by an electrical circuit, a potentiometer in said circuit, and a timing device for progressively changing the resistance of the potentiometer to increase the sensitivity of said recording system substantially as said function of time whereby the average amplitude of the record is substantially constant throughout the period of reception of said waves.

FRANK RIEBER.